US012418232B2

(12) United States Patent
Forouzesh et al.

(10) Patent No.: US 12,418,232 B2
(45) Date of Patent: Sep. 16, 2025

(54) THREE-PHASE RECTIFIER WITH RECONFIGURABLE MODULES FOR WIDE OUTPUT VOLTAGE RANGE

(71) Applicant: Queen's University at Kingston, Kingston (CA)

(72) Inventors: Mojtaba Forouzesh, Kingston (CA); Yan-Fei Liu, Kingston (CA)

(73) Assignee: Queen's University at Kingston, Kingston (CA)

( * ) Notice: Subject to any disclaimer, the term of this patent is extended or adjusted under 35 U.S.C. 154(b) by 248 days.

(21) Appl. No.: 18/214,820

(22) Filed: Jun. 27, 2023

(65) Prior Publication Data

US 2024/0007005 A1    Jan. 4, 2024

Related U.S. Application Data

(60) Provisional application No. 63/356,474, filed on Jun. 28, 2022.

(51) Int. Cl.
| | |
|---|---|
| *H02M 1/14* | (2006.01) |
| *H02M 1/00* | (2006.01) |
| *H02M 3/00* | (2006.01) |
| *H02M 3/335* | (2006.01) |
| *H02M 7/04* | (2006.01) |

(Continued)

(52) U.S. Cl.
CPC ........... *H02M 1/14* (2013.01); *H02M 1/0077* (2021.05); *H02M 1/143* (2013.01); *H02M 3/01* (2021.05); *H02M 3/33507* (2013.01); *H02M 7/04* (2013.01); *H02M 7/17* (2013.01); *H02M 7/23* (2013.01); *H02M 3/33573* (2021.05)

(58) Field of Classification Search
CPC .......... H02M 1/14; H02M 1/143; H02M 3/01; H02M 3/33507; H02M 3/33573; H02M 7/07; H02M 7/17; H02M 7/23; H02M 7/04

See application file for complete search history.

(56) References Cited

U.S. PATENT DOCUMENTS

| | | | | |
|---|---|---|---|---|
| 2013/0207562 | A1* | 8/2013 | Zhang | H02M 7/23 315/201 |
| 2015/0194877 | A1* | 7/2015 | Hsiao | H02J 3/381 363/70 |

(Continued)

*Primary Examiner* — Gary L Laxton
(74) *Attorney, Agent, or Firm* — Stephen J. Scribner

(57) ABSTRACT

A three phase rectifier includes n converter modules in each phase A, B, and C, wherein the AC inputs of the n converter modules of each phase are connected together in parallel, and the DC outputs of respective first to $n^{th}$ converter modules of phases A, B, and C are connected together in parallel as first to $n^{th}$ sub-combinations of DC outputs. The first to $n^{th}$ sub-combinations of DC outputs may be connected together in selected modes to produce a range of total output DC voltage, wherein the range of total output DC voltage is substantially free of double line frequency ripple and the converter modules are implemented without electrolytic output capacitors. The three phase rectifier is suitable for use in high power applications such as electric vehicle fast chargers.

20 Claims, 9 Drawing Sheets

(51) Int. Cl.
 *H02M 7/17* (2006.01)
 *H02M 7/23* (2006.01)

(56) References Cited

U.S. PATENT DOCUMENTS

2017/0063215 A1* 3/2017 Nikitin .................... H02M 7/23
2022/0118864 A1* 4/2022 Zhang .................... B60L 53/14
2022/0416684 A1* 12/2022 Awal ..................... H02M 7/219

* cited by examiner

THREE-PHASE RECTIFIER WITH RECONFIGURABLE MODULES FOR WIDE OUTPUT VOLTAGE RANGE

RELATED APPLICATION

This application claims the benefit of the filing date of Application No. 63/356,474, filed Jun. 28, 2022, the contents of which are incorporated herein by reference in their entirety.

FIELD

This invention relates generally to three-phase AC-DC converters. More specifically, the invention relates to three phase rectifiers with two or more converter modules in each phase, wherein the converter modules are arranged in sub-combinations that can be configured for various output DC voltage ranges.

BACKGROUND

High power rectifiers have been widely used in many applications including, electric vehicle (EV) DC fast charging, energy storage systems (ESS), medium voltage DC (MVDC) grid, etc. With the advancement of different technologies and the consequent requirement for higher power, higher DC voltage levels are being adopted to reduce conduction loss. For example, in battery ESS or EV fast charging a wide DC voltage range is required to charge the high voltage energy storage battery. Initially, 400 V was the only high voltage battery standard for EVs, however, 800 V battery is becoming more prevalent in long-range EVs. Similarly, in battery ESS the standard bus voltage was 400 V for renewable energy applications, however, for MVDC grid application the voltage may be at the kV level [1]-[4]

Furthermore, in wind energy applications usually large medium voltage (MV) transformers are required to connect to the MVAC grid, which are bulky and costly. Instead, a DC voltage can be used to connect to an MVDC grid to improve performance and reduce cost. In the conventional approach, a three-phase rectifier is used in the front connected to a DC-DC converter to step up the voltage to the voltage level of the MVDC grid [5]. To improve the system power density and efficiency single-stage three-phase rectifiers with the ability to produce kV voltage levels are preferred. To meet the wide voltage range of different loads, various strategies for reconfiguration of the rectifier input and/or output to multiply the voltage and/or current have been proposed [6]-[9], however, there are limitations to such approaches.

SUMMARY

Provided herein are single-stage three-phase rectifier topologies with reconfigurable output connections for wide output voltage range applications. An advantage of the embodiments is that the fluctuating current in each phase, i.e., the double line frequency current ripple (100 Hz or 120 Hz), is cancelled out at the output of the converter modules and hence no electrolytic capacitor is needed for output filtering, which significantly increases the system reliability. Moreover, since the output current/voltage is shared equally in the reconfigurable output series, parallel, or series-parallel connections, low voltage and current rating devices may be used over the wide output voltage range for a rated output power operation. A unity power factor may be achieved in each phase by implementing power factor correction in each converter module. In some embodiments, using soft-switching converter modules allows high switching frequency implementation and consequently the size of magnetic components (e.g., resonant inductor, isolating transformer) may be reduced. A high power density may be achieved by using single-stage AC to DC converter modules with no requirement for bulky passive components.

According to embodiments, a three phase rectifier may comprise: n converter modules in each phase A, B, and C of the three phase rectifier, each of the n converter modules in each phase A, B, and C having an input that receives an AC voltage and an output that outputs a DC voltage; wherein the AC inputs of the n converter modules of phase A are connected together in parallel, the AC inputs of the n converter modules of phase B are connected together in parallel, and the AC inputs of the n converter modules of phase C are connected together in parallel; wherein the DC output of a first converter module of phase A, the DC output of a first converter module of phase B, and the DC output of a first converter module of phase C are connected together in parallel as a first sub-combination DC output; wherein the DC output of a $n^{th}$ converter module of phase A, the DC output of a $n^{th}$ converter module of phase B, and the DC output of a $n^{th}$ converter module of phase C are connected together in parallel as a $n^{th}$ sub-combination DC output; a mode switcher having inputs connected to respective first to $n^{th}$ sub-combination DC outputs and having an output that outputs a total output DC voltage; wherein the mode switcher connects the first to $n^{th}$ sub-combination DC outputs together in selected modes to produce a range of total output DC voltage; wherein the range of total output DC voltage is substantially free of double line frequency ripple; wherein the converter modules are implemented without electrolytic output capacitors.

According to embodiments, the selected modes may be selected from series, parallel, and series-parallel connections of the first to $n^{th}$ sub-combination DC outputs.

One embodiment comprises n=2 converter modules in each phase A, B, C; wherein each converter module has an output DC voltage of $V_x$; wherein the range of total output DC voltage is from $V_x$ to $2V_x$.

One embodiment comprises n=4 converter modules in each phase A, B, C; wherein each converter module has an output DC voltage of $V_x$; wherein the range of total output DC voltage is from $V_x$ to $4V_x$.

In one embodiment the n converter modules in each phase A, B, C are substantially the same.

According to embodiments, the n converter modules are selected from LLC resonant converter, boost converter, dual active bridge (DAB) converter, LCLC converter, active clamp boost converter, flyback converter, SEPIC converter, Zeta converter, and Cuk converter.

In one embodiment the n converter modules are LLC resonant converters.

In one embodiment the mode switcher automatically selects a mode to deliver a selected total output DC voltage to a load.

In one embodiment a three phase AC input source is configured as line-to-line voltage.

In one embodiment a three phase AC input source is configured as phase voltage.

Also provided herein is an electric vehicle charger comprising a three phase rectifier according to embodiments described herein.

Also provided herein is a method for implementing a three phase rectifier, comprising: providing n converter modules in each phase A, B, and C of the three phase rectifier, each of the n converter modules in each phase A, B, and C having an input that receives an AC voltage and an output that outputs a DC voltage; wherein the AC inputs of the n converter modules of phase A are connected together in parallel, the AC inputs of the n converter modules of phase B are connected together in parallel, and the AC inputs of the n converter modules of phase C are connected together in parallel; wherein the DC output of a first converter module of phase A, the DC output of a first converter module of phase B, and the DC output of a first converter module of phase C are connected together in parallel as a first sub-combination DC output; wherein the DC output of a $n^{th}$ converter module of phase A, the DC output of a $n^{th}$ converter module of phase B, and the DC output of a $n^{th}$ converter module of phase C are connected together in parallel as a $n^{th}$ sub-combination DC output; connecting the first to $n^{th}$ sub-combination DC outputs together in selected modes to produce a range of total output DC voltage; wherein the range of total output DC voltage is substantially free of double line frequency ripple; wherein the converter modules are implemented without electrolytic output capacitors.

According to embodiments the method may comprise using a mode switcher to connect the first to $n^{th}$ sub-combination DC outputs together in selected modes to produce the range of total output DC voltage.

According to embodiments the selected modes may be selected from series, parallel, and series-parallel connections of the first to $n^{th}$ sub-combination DC outputs.

According to one embodiment the method may comprise providing n=2 converter modules in each phase A, B, C; wherein each converter module has an output DC voltage of $V_x$; wherein the range of total output DC voltage is from $V_x$ to $2V_x$.

According to one embodiment the method may comprise providing n=4 converter modules in each phase A, B, C; wherein each converter module has an output DC voltage of $V_x$; wherein the range of total output DC voltage is from $V_x$ to $4V_x$.

According to embodiments the n converter modules may be selected from LLC resonant converter, boost converter, dual active bridge (DAB) converter, LCLC converter, active clamp boost converter, flyback converter, SEPIC converter, Zeta converter, and Cuk converter.

In one embodiment the n converter modules are LLC resonant converters.

According to embodiments the method may comprise automatically selecting a mode to deliver a selected total output DC voltage to a load.

BRIEF DESCRIPTION OF THE DRAWINGS

For a greater understanding of the invention, and to show more clearly how it may be carried into effect, embodiments will be described, by way of example, with reference to the accompanying drawings, wherein:

FIGS. 4-7 show simulation results for a three-phase rectifier using two converter modules in each phase according to one embodiment, where, from top to bottom, the plots show the three phase rectifier output voltage $V_o$, the output current $I_o$, the output voltage of each converter module $V_{oA1}$, $V_{oA2}$, $V_{oB1}$, $V_{oB2}$, $V_{oC1}$, and $V_{oC2}$, the input three-phase line to line voltage $V_{ab}$, $V_{bc}$, $V_{ca}$, the input current for each phase $I_{inA1}$, $I_{inA2}$, $I_{inB1}$, $I_{inB2}$, $I_{inC1}$, and $I_{inC2}$, and the resonant current for each phase; wherein FIG. 4 is for $V_o$=200 V at $P_o$=60 kW; FIG. 5 is for $V_o$=400 V at $P_o$=60 kW; FIG. 6 is for $V_o$=800 V at $P_o$=60 kW; and FIG. 7 is for $V_o$=1200 V at $P_o$=60 kW.

DETAILED DESCRIPTION OF EMBODIMENTS

Described herein are isolated three-phase single-stage rectifiers with reconfigurable output connections. According to embodiments, each phase includes two or more converter modules each having an input rectifier bridge, inverter bridge, isolation transformer, and output rectifier bridge. The connection of the output rectifiers of different modules in each phase and with respective rectifiers in the other phases produces various voltage levels. An advantage of the embodiments is that only a small output capacitance is needed in each converter module as the AC line fluctuating current is cancelled in the output capacitor, which eliminates the need for electrolytic capacitors while achieving negligible output voltage ripple. Moreover, for high output voltage levels, since the voltage, current, and thermal stresses are distributed between the converter modules, semiconductor devices with lower voltage/current ratings can be used in each module which increases the system reliability and reduces the cost.

As used herein, the term "substantially" means that the recited characteristic, parameter, and/or value need not be achieved exactly, but that deviations or variations, including for example, tolerances, measurement error, measurement accuracy limitations and other factors known to those of ordinary skill in the art may occur in amounts that do not preclude the effect the characteristic was intended to provide. A characteristic or feature that is substantially reduced or removed (e.g., the double line frequency (e.g., 100 or 120 Hz) ripple in the three-phase converter output voltage) may be eliminated or significantly reduced or minimized so that it is within the noise, beneath background, below detection capabilities, or of no consequence in a practical application.

Figure 1A:
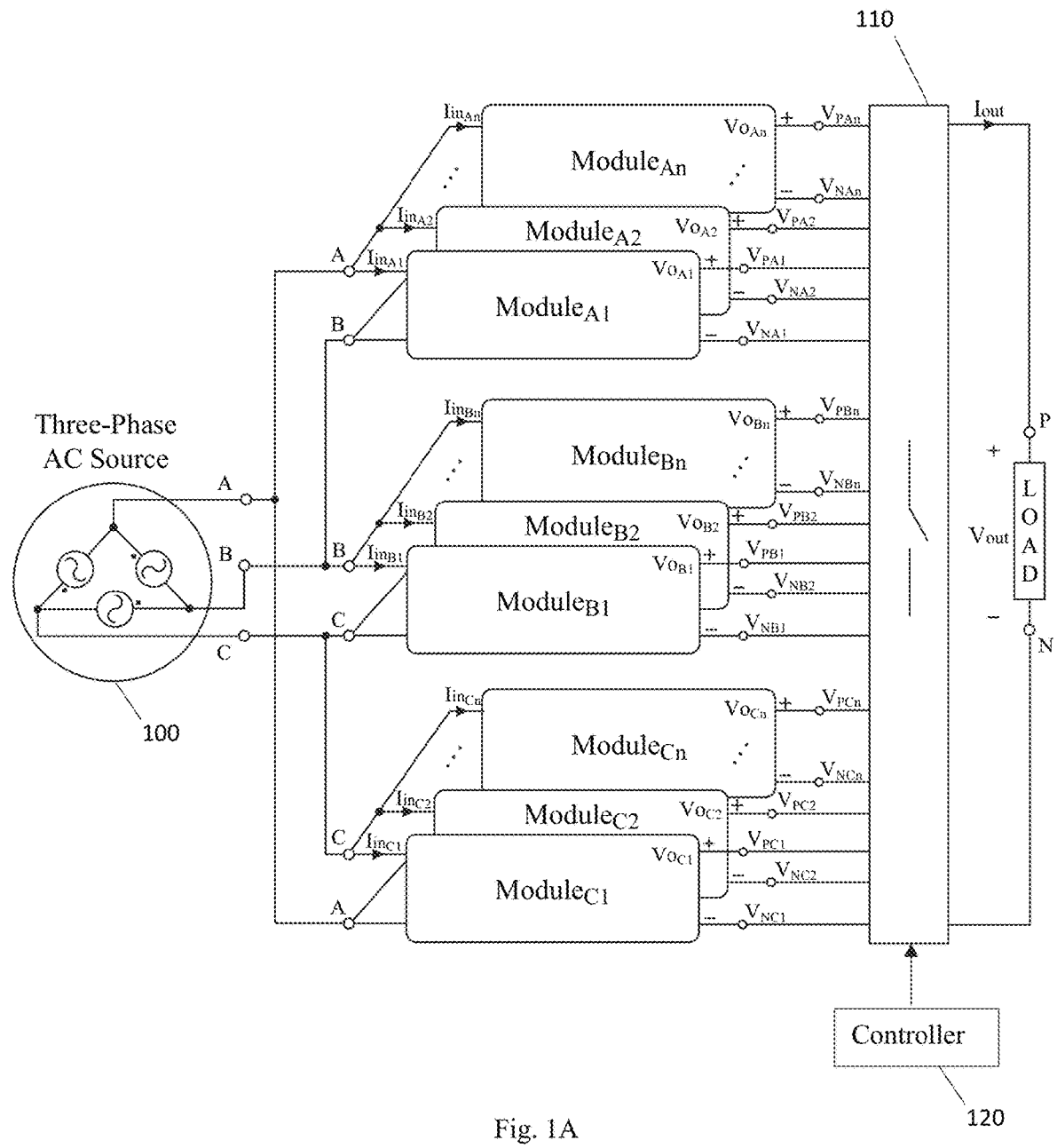
FIGS. 1A and 1B are block diagrams showing general structures of reconfigurable single stage three-phase rectifiers with n converter modules in each phase (n=2, 3, . . . ), according to embodiments.

FIG. 1A is a block diagram of a generalized structure of a three-phase single-stage rectifier according to embodiments. A three-phase source 100, which may be a Delta or Y configuration, provides input power to the converter modules of each phase A, B, and C. The topology is based on a phase-modular approach with n converter modules (n=2, 3, . . . ) in each phase, i.e., Module$_{A1}$, Module$_{A2}$, . . . , Module for phase A. The inputs of modules $A_1$, $B_1$, $C_1$ are connected to phase AB, BC, and CA, respectively. With at least two converter modules in each phase three-phase rectification and power factor correction (PFC) in each phase may be achieved for a narrow output voltage range (e.g., for a ratio of 1:2, i.e., a doubling of the output voltage). By increasing the number of modules in each phase higher output power and voltage levels, as well as a wider output voltage range, may be achieved. Although there is no theoretical limit to the number of converter modules in each phase, the number may be limited by practical design considerations for a given application and/or the parameters of available switching devices and other components. Based on currently available technology it is expected that eight converter modules in each phase may be practical.

Figure 1B:
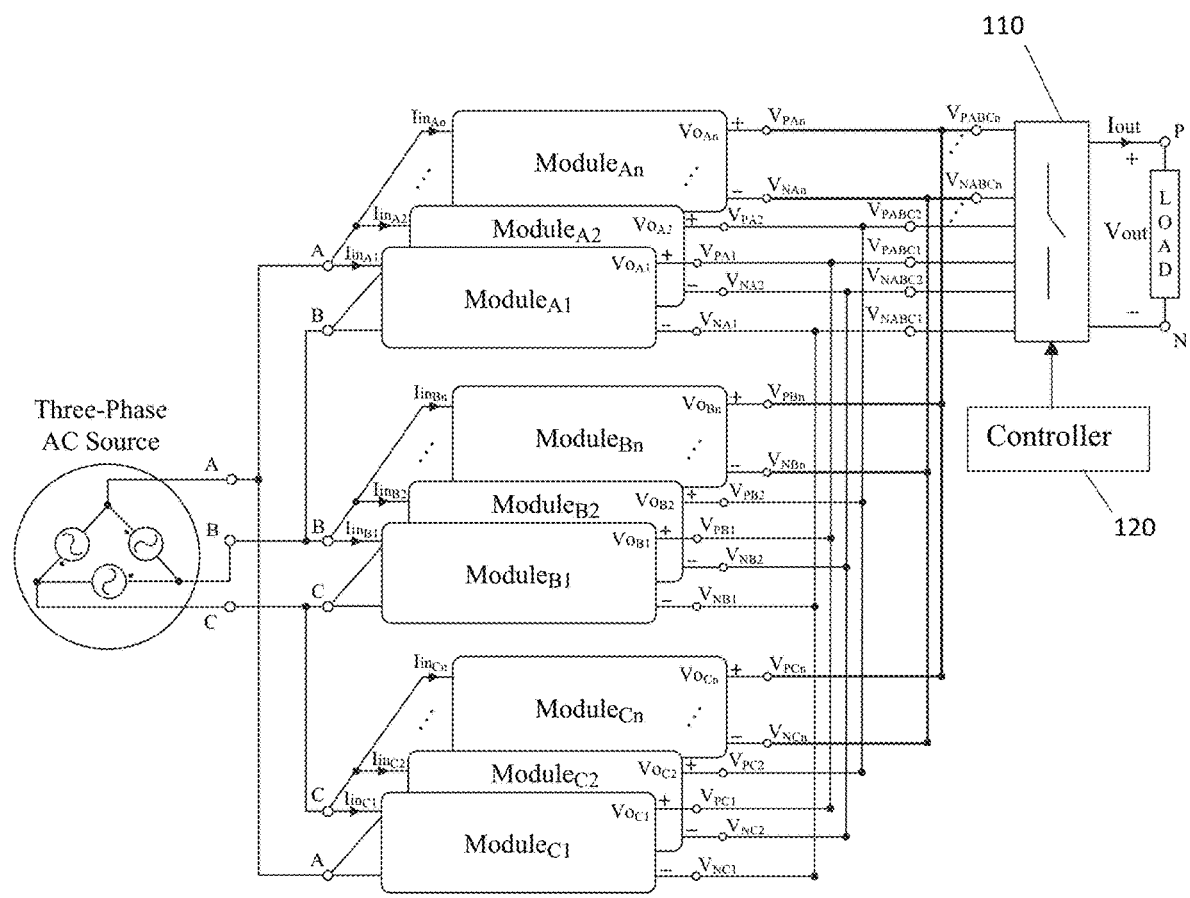

Each converter module includes an output rectifier and an output capacitor $C_o$. A mode switcher 110 may be used at the positive (P) and negative (N) output terminals of the of the converter modules to configure different output connections between the converter modules. The mode switcher provides the final output power ($V_{out}$, $I_{out}$) to the load, as shown in FIG. 1A. The mode switcher may be implemented with switches configured to provide various output connections of the converter modules in each phase. As shown in FIGS. 1A and 1B, the mode switcher 100 may include a sensing and/or communication and control circuit, i.e., a controller 120 that performs one or more functions such as sensing and/or communicating (wired or wireless) with a device that the three phase rectifier output is connected to, to determine the correct output voltage to be delivered to the device and automatically controlling the mode switcher to set the appropriate connections of converter modules so as to achieve the correct output voltage.

As a non-limiting example, a three phase rectifier embodiment may be configured for charging electric vehicles (EVs). Since different EVs may have different charging voltage requirements, the sensing and/or communication circuit of the controller may determine the correct output voltage for the EV to which it is connected and the controller controls the mode switcher to configure the connections of the three phase rectifier converter modules or sub-combinations of converter modules to provide the correct output voltage for the EV. Examples of output connections with a small number of converter modules (e.g., two or four converter modules in each phase) are described herein. However, other embodiments may have other numbers of converter modules in each phase.

In the non-limiting example of an EV charger, such an implementation may include two converter modules in each phase, resulting in a total of six converter modules for a 40 kW Level 3 EV fast charger. The input voltage may be 480 V three-phase AC. The output voltage may be adjusted from 250 V to 1000 V. The six modules may be configured in two sub-combinations as described in detail below. When the two sub-combinations are connected in parallel, the output voltage may be adjusted from 250 V to 500 V (e.g., to charge a 400 V battery). When the two sub-combinations are connected in series, the output voltage may be adjusted from 500 V to 1000 V (e.g., to charge an 800 V battery).

FIG. 1B is a block diagram of a generalized structure according to another embodiment. In FIG. 1B the inputs of converter modules $A_1$, $B_1$, $C_1$ are connected to phase AB, BC, and CA, respectively. In FIG. 1B the output terminals of the first module in each phase (i.e., module $A_1$, $B_1$, $C_1$) are connected together in parallel and then connected to the load through a mode switcher. That is, terminals $V_{pA1}$, $V_{pB1}$, $V_{pC1}$ are connected together and terminals $V_{NA1}$, $V_{NB1}$, $V_{NC1}$ are connected together. Similarly, the output terminals of the second module in each phase (i.e., module $A_2$, $B_2$, $C_2$) are connected together in parallel and then connected to the load through a mode switcher, and so on until the $n^{th}$ converter module. Accordingly, as used herein, the term "three modules connected in parallel" refers to the three modules wherein the input terminals are connected to each phase of the three-phase AC input voltage and the converter module output terminals are connected together in parallel.

According to embodiments, each converter module is controlled to achieve power factor correction and generate substantially the same output power. Examples of suitable control strategies are described in co-pending International Application No. PCT/CA PCT/CA2023/050867, incorporated herein by reference. For example, module $A_2$, $B_2$, $C_2$ are connected in parallel to form a sub-combination, ABC2. Module $A_2$, $B_2$, $C_2$ all achieve power factor correction and generate substantially the same output power.

Figure 2A:
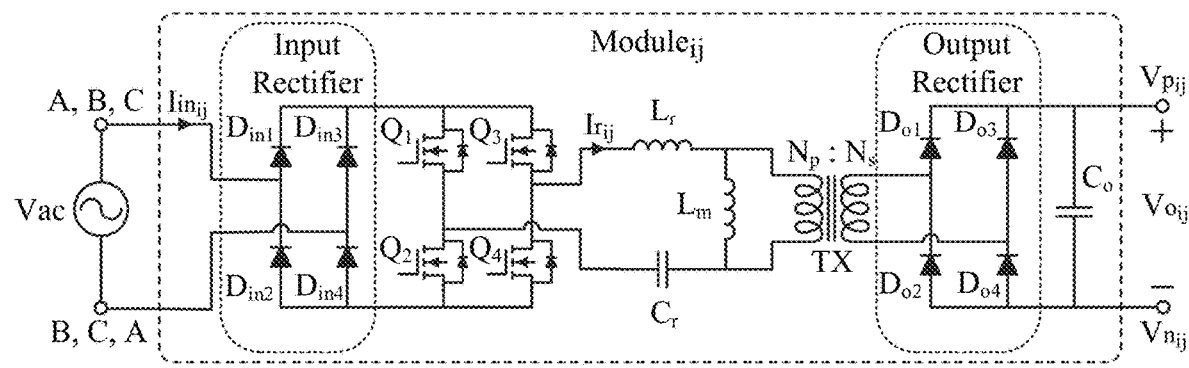
FIGS. 2A and 2B are schematic diagrams of single stage converter modules that may be used in each phase of a wide output voltage phase-modular three-phase rectifier (I=A, B, C; j=1, 2, 3, . . . ), wherein (A) is an example of an isolated frequency controlled converter with LLC resonant tank, and (B) is an example of isolated duty cycle controlled converter with Boost inductor, according to the prior art.
Figure 2B:
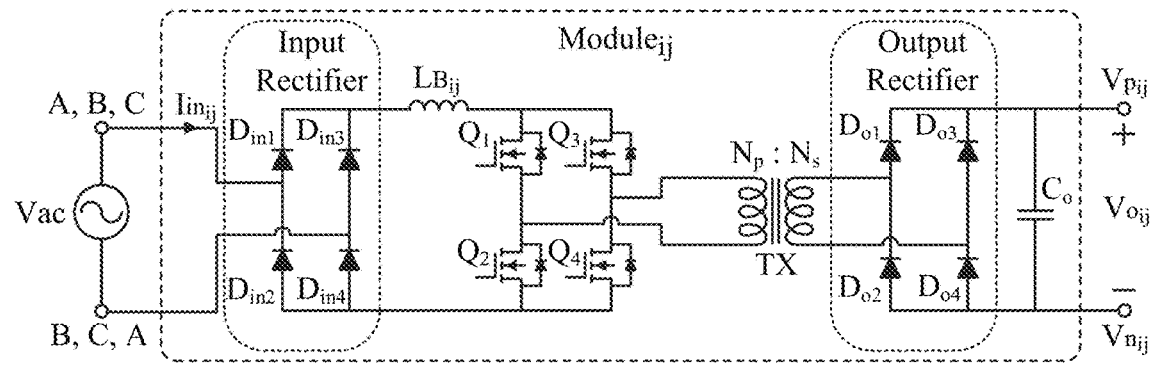

Each converter module may be based on either pulse width modulation (PWM) duty cycle control or pulse frequency modulation (PFM) frequency control. FIGS. 2A and 2B are schematic diagrams showing examples of common PFM and PWM converter modules that may be used in various embodiments, an LLC (inductor-inductor-capacitor) resonant converter and a boost converter, respectively. Other converter modules such as but not limited to dual active bridge (DAB) converter, LCLC converter, active clamp boost converter, flyback converter, SEPIC converter, Zeta converter, and Cuk converter may also be used. Depending on the application, the switching bridge and rectifier structure may be either half-bridge or full-bridge, and the selection of isolation transformer may also based on the application requirements, for example, a center tapped transformer may be used for low output voltage and high current applications. The parameters of each converter module, such as power rating, output voltage rating, etc., may be the same. Each converter module may be based on the same topology and same parameters. Different topologies with the same power rating may also be used for the modules, for example, modules rated at 200 V output voltage and 10 kW output power implemented with LLC topology may be used for modules $A_1$, $B_1$, $C_1$ and implemented with isolated boost topology may be used for module $A_2$, $B_2$, $C_2$. However, there are no benefits to be derived from such a configuration.

Throughout the rest of this disclosure, embodiments are described based on an LLC resonant converter used in each module for analysis and computer simulation. Each module includes an input rectifier bridge ($D_{in1}$-$D_{in4}$) followed by an inverter bridge with switches ($Q_1$-$Q_4$) and an LLC resonant tank (Lr-$L_m$-$C_r$) connected to an isolation transformer TX and an output rectifier bridge ($D_{o1}$-$D_{o4}$) which may be implemented with diodes or switches such as MOSFETs, and an output capacitor $C_o$. By using an LLC resonant converter to perform the PFC, switching losses are minimized by implementing zero voltage switching (ZVS) for the inverter bridge switches and zero current switching (ZCS) for the output rectifier bridge switches. Thus, a high switching frequency can be implemented to minimize the size of passive components. To achieve PFC, the switching frequency of each module may be varied independently between the parallel resonant frequency and series resonant frequency of the LLC resonant tank to achieve high voltage gain around the line voltage zero crossing and unity gain around the peak line voltage.

The multiple converter modules in each phase allow distributed power loss and thermal stress. In some embodiments high output voltages and wide output voltage ranges may be achieved by reconfiguring the connections of the converter module outputs while using switching devices and components with low voltage ratings. Moreover, since the input AC fluctuation (i.e., the double line frequency (100 or 120 Hz) ripple) of the three-phase system is substantially cancelled in the output $V_o$ of the rectifier, due to the configuration of the connections of the outputs of the converter modules in each phase to generate the rectifier output, no bulky electrolytic capacitor is needed in the output, and as electrolytic capacitors are prone to failure the reliability of embodiments is improved over prior designs. Therefore, according to embodiments the double line frequency ripple is cancelled and is substantially zero (or very small), the output capacitor is only used for filtering out switching frequency ripple and its value is very small. For example, a film capacitor with value of 10 to 50 uF may be used for the output filter. In contrast, if the double line frequency ripple was not substantially cancelled it would have to be filtered using a large electrolytic capacitor of at least 500 uF.

As described above a mode switcher may be implemented at the output of three-phase rectifier embodiments to switch between various output configurations and corresponding output voltages. The final output configuration of the converter modules from the mode switcher is the three phase rectifier output ($V_{out}$, $I_{out}$) that is connected to the positive (P) and negative (N) nodes of the load, as shown in the generalized embodiments of FIGS. 1A and 1B. As examples, output configurations for the case with two converter modules (i.e., n=2) in each phase are listed in Tables 1A and 1B. In these embodiments a total of six converter modules (which may be, for example, LLC modules) may be used. As further examples, output configurations for the case with four converter modules (i.e., n=4) in each phase are listed in Tables 2A and 2B. In these embodiments a total of twelve converter modules (which may be, for example, LLC modules) may be used. In Tables 1A, 1B, 2A and 2B the rated DC output voltage of each converter module is $V_x$ operated at $I_x$ output current. Moreover, to cover the whole output voltage range a voltage gain of 2 may be implemented in the design of each converter module. Hence, each module provides power over $0.5 \times V_x$ to $V_x$ output voltage levels.

TABLE 1A

Output configuration selection for two converter modules in each phase, according to one embodiment.

| Mode Selection | Output Configuration | Output Voltage | Output Current |
|---|---|---|---|
| 1 | ($V_{oA1}$ + $V_{oA2}$) + ($V_{oB1}$ + $V_{oB2}$) + ($V_{oC1}$ + $V_{oC2}$) | $1 \times V_x$ | $6 \times I_x$ |
| 2 | ($V_{oA1}$ + $V_{oB1}$ + $V_{oC1}$) − ($V_{oA2}$ + $V_{oB2}$ + $V_{oC2}$) | $2 \times V_x$ | $3 \times I_x$ |
| 3 | ($V_{oA1}$ + $V_{oA2}$) − ($V_{oB1}$ + $V_{oB2}$) − ($V_{oC1}$ + $V_{oC2}$) | $3 \times V_x$ | $2 \times I_x$ |

Note:
"+" represents parallel connection, "−" represents series connection.

TABLE 1B

Output configuration selection for two converter modules in each phase, according to one embodiment.

| Mode Selection | Output Configuration | Output Voltage | Output Current |
|---|---|---|---|
| 1 | ($V_{oA1}$ + $V_{oB1}$ + $V_{oC1}$) + ($V_{oA2}$ + $V_{oB2}$ + $V_{oC2}$) | $1 \times V_x$ | $6 \times I_x$ |
| 2 | ($V_{oA1}$ + $V_{oB1}$ + $V_{oC1}$) − ($V_{oA2}$ + $V_{oB2}$ + $V_{oC2}$) | $2 \times V_x$ | $3 \times I_x$ |
| 3 | ($V_{oA1}$ + $V_{oA2}$) − ($V_{oB1}$ + $V_{oB2}$) − ($V_{oC1}$ + $V_{oC2}$) | $3 \times V_x$ | $2 \times I_x$ |

Note:
"+" represents parallel connection, "−" represents series connection.

As observed in Table 1A, in mode 1 all six converter modules are connected in parallel so that the combined output voltage is same as the output voltage of each converter module and the combined output current is six times that of each module.

In Table 1A, in mode 2 two sub-combinations are formed. Each sub-combination is a parallel connection of three modules, one module selected from each phase (phase AB, phase BC, and phase CA). For example, sub-combination 1 (ABC1) may include parallel connection of output voltages of $V_{oA1}$, $V_{oB1}$, and $V_{oC1}$ of modules $A_1$, $B_1$, $C_1$. Similarly, sub-combination 2 (ABC2) may include parallel connection of output voltages of $V_{oA2}$, $V_{oB2}$, and $V_{oC2}$ of modules $A_2$, $B_2$, $C_2$. These two sub-combinations (ABC1 and ABC2) are then connected in series. With this connection, the combined output voltage is two times of the output voltage of each module ($2*V_x$) and the combined output current is three times the output current of each module ($3*I_x$).

Table 1B shows the modes in Table 1A using the sub-combination described above. In Table 1B, the expression for mode 2 is same as that in Table 1A. In Table 1B, the expression for mode 1 is as the sub-combination described above. Thus the connections in Tables 1A and 1B are the same, but they are expressed in Table 1B as sub-combinations.

Figure 3A:
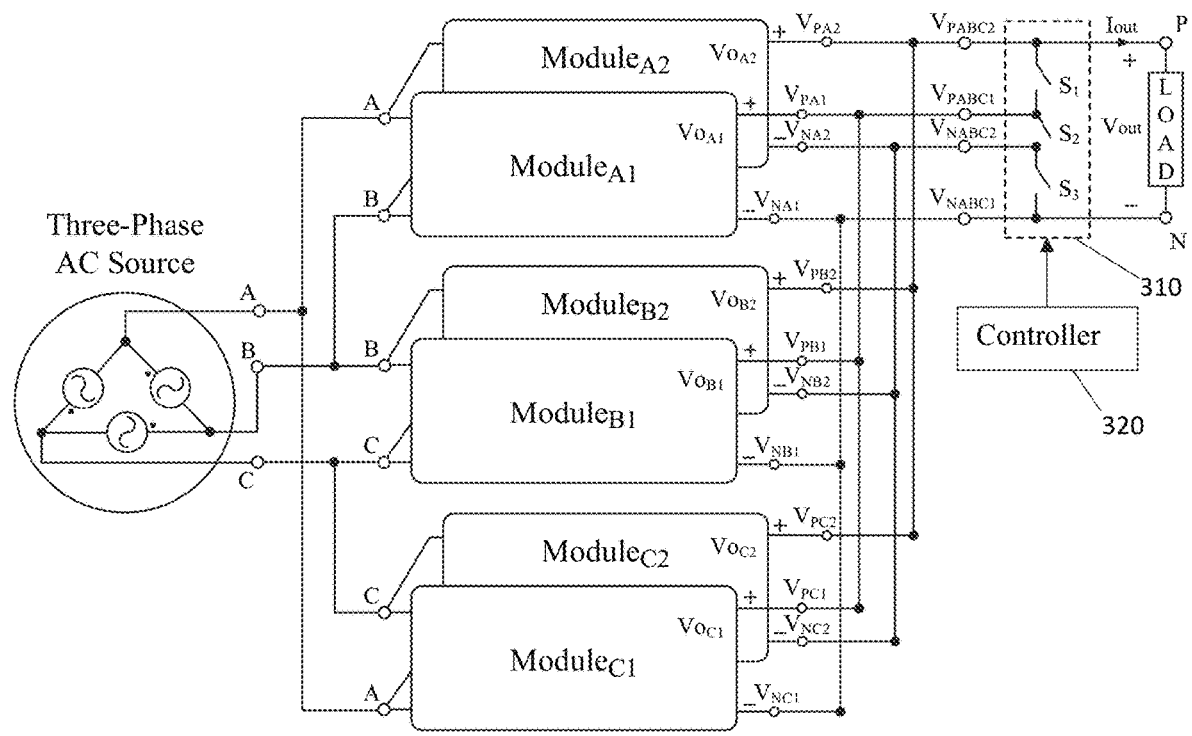
FIGS. 3A-3D are block diagrams of a reconfigurable single stage three-phase rectifier with two converter modules in each phase configured according to three different modes, according to embodiments.

FIG. 3A-3D are block diagrams of embodiments with two converter modules in each phase, for a total six modules. In FIG. 3A converter modules $A_1$, $B_1$, $C_1$ are connected in parallel to form sub-combination ABC1, and modules $A_2$, $B_2$, $C_2$ are connected in parallel to form sub-combination ABC2. A mode switcher 310 includes switches S1, S2, and S3. A controller 320 may be used to control the mode switcher as discussed above. When switch S1 and switch S3 are closed and switch S2 is open, sub-combinations ABC1 and ABC2 are connected in parallel, resulting in all six modules being connected in parallel. This connection corresponds to mode 1 operation in Tables 1A and 1B. When switch S1 and switch S3 are open and switch S2 is closed, sub-combinations ABC1 and ABC2 are connected in series. This connection corresponds to mode 2 operation in Tables 1A and 1B.

Figure 3B:
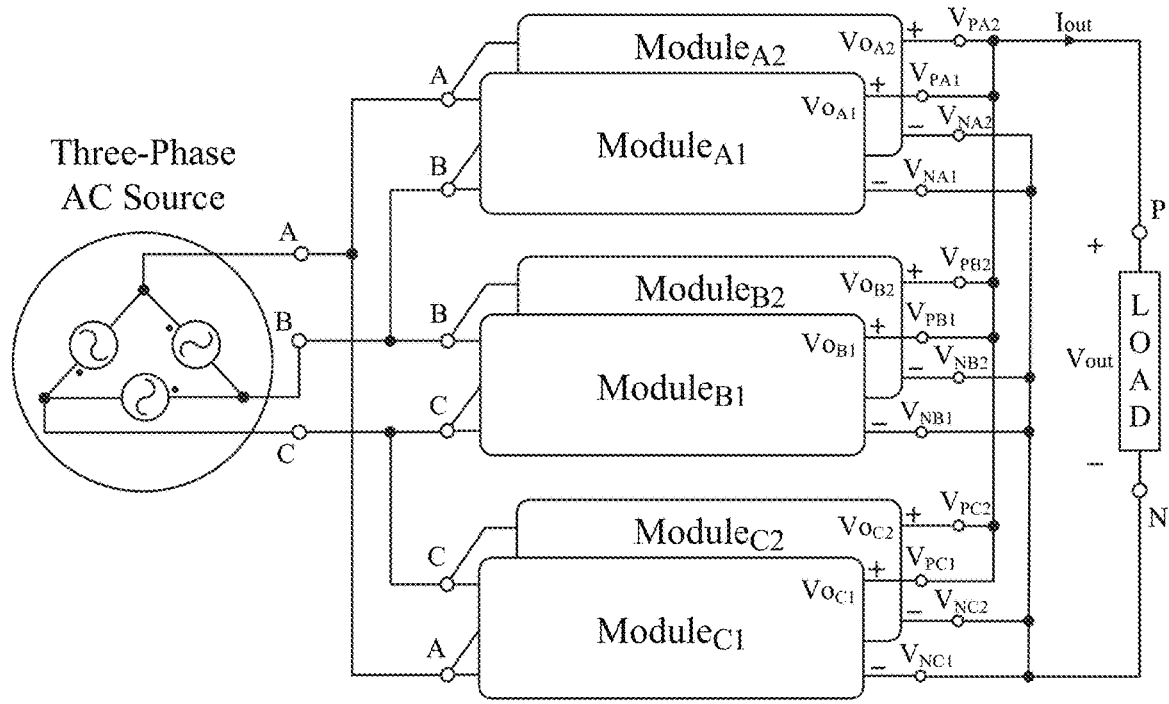
Figure 3C:
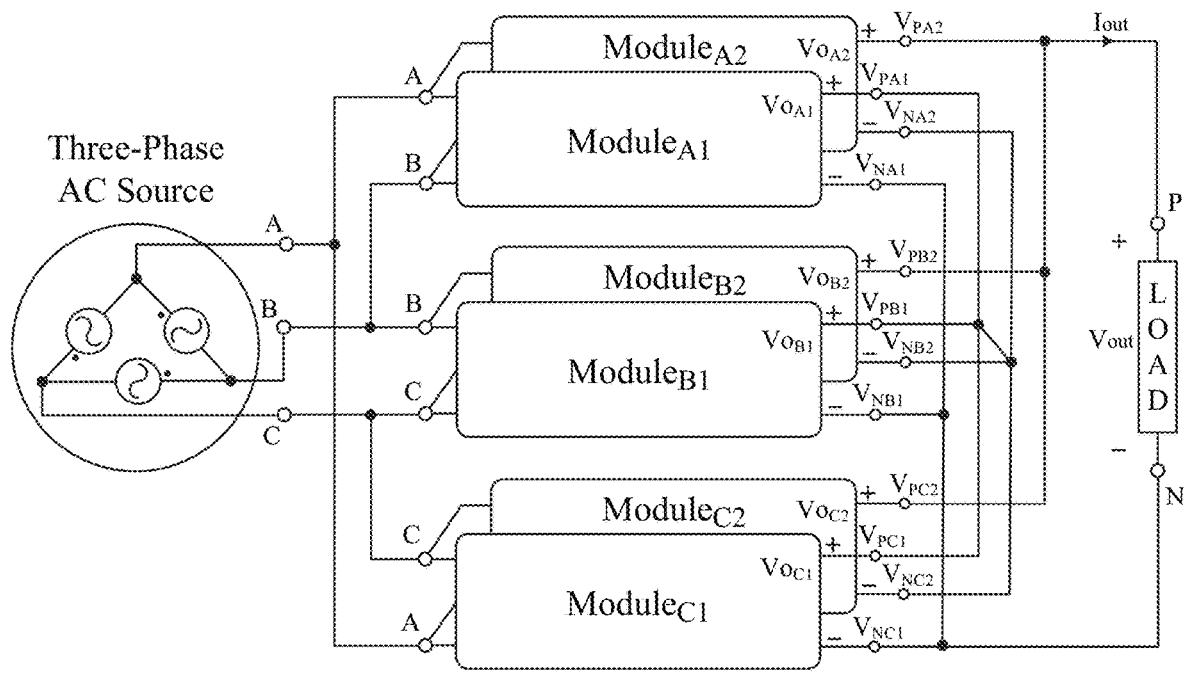
Figure 3D:
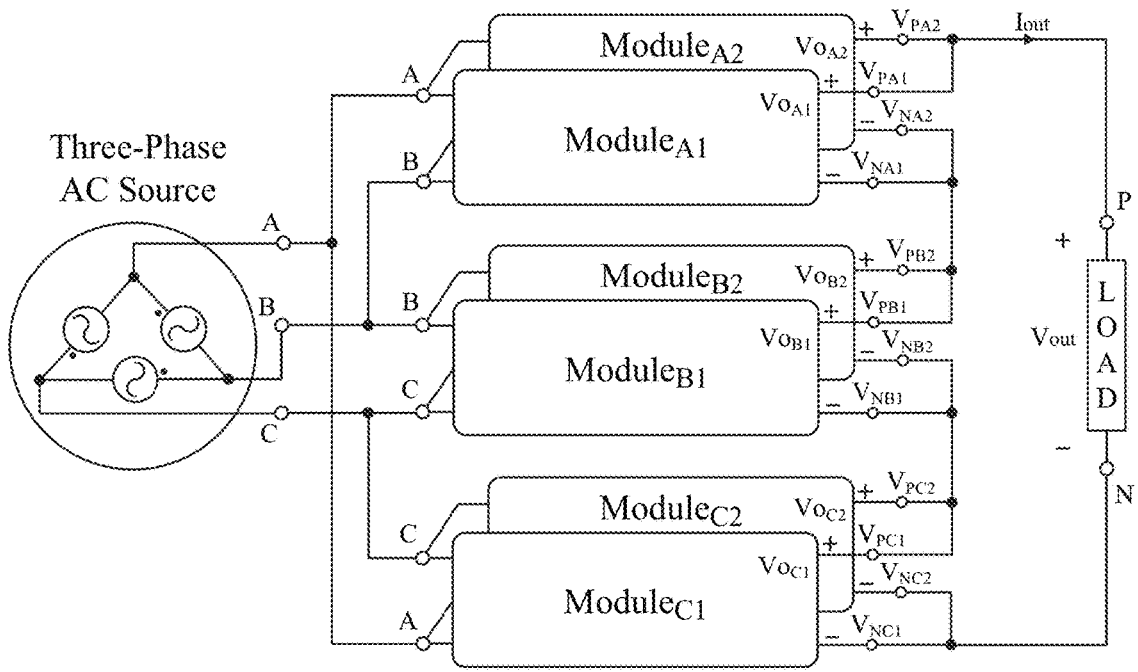

FIGS. 3B to 3D are block diagrams of embodiments with two converter modules in each phase for the three output connections listed in Tables 1A and 1B (i.e., FIG. 3B shows Mode 1, FIG. 3C shows Mode 2, and FIG. 3D shows Mode 3). In FIGS. 3B to 3D the mode switcher is not shown. Instead, the connections of the outputs of converter modules are shown as achieved by the mode switcher. In Mode 1 and Mode 2 from Tables 1A and 1B no low-frequency current flows through the output capacitors so they may be very small as they only handle the high switching frequency current ripples. However, due to the series connection of the output of three phases in Mode 3 of Tables 1A and 1B (FIG. 3D) some double line frequency current ripple will flow through each phase, and large electrolytic capacitors would have to be used in the outputs of the converter modules to remove the double line frequency ripple. Therefore, when a small number of modules (e.g., two modules) are used in each phase mode 3 should not be used in order to avoid the need for electrolytic capacitors. Instead, for applications where a higher output voltage $V_{out}$ is required, embodiments based on more than two converter modules in each phase may be used. Such an embodiment is described below.

Thus, in order to avoid using electrolytic capacitors, the number of converter modules used in each phase may be increased to achieve the same or higher output voltage levels. Embodiments having four converter modules in each phase, i.e., modules $A_{1-4}$, $B_{1-4}$, $C_{1-4}$ will now be described with reference to Tables 2A and 2B.

TABLE 2A

Output configuration selection for four converter modules in each phase, according to one embodiment.

| Mode Selection | Output Configuration | Output Voltage | Output Current |
|---|---|---|---|
| 1 | $(V_{oA1} + V_{oA2} + V_{oA3} + V_{oA4}) + (V_{oB1} + V_{oB2} + V_{oB3} + V_{oB4}) + (V_{oC1} + V_{oC2} + V_{oC3} + V_{oC4})$ | $1 \times V_x$ | $12 \times I_x$ |
| 2 | $((V_{oA1} + V_{oA2}) + (V_{oB1} + V_{oB2}) + (V_{oC1} + V_{oC2})) - ((V_{oA3} + V_{oA4}) + (V_{oB3} + V_{oB4}) + (V_{oC3} + V_{oC4}))$ | $2 \times V_x$ | $6 \times I_x$ |
| 3 | $(V_{oA1} + V_{oB1} + V_{oC1}) - (V_{oA2} + V_{oB2} + V_{oC2}) - (V_{oA3} + V_{oB3} + V_{oC3}) - (V_{oA4} + V_{oB4} + V_{oC4})$ | $4 \times V_x$ | $3 \times I_x$ |

Note:
"+" represents parallel connection, "−" represents series connection.

TABLE 2B

Output configuration selection for four converter modules in each phase, according to one embodiment

| Mode Selection | Output Configuration | Output Voltage | Output Current |
|---|---|---|---|
| 1 | $(V_{oA1} + V_{oB1} + V_{oC1}) + (V_{oA2} + V_{oB2} + V_{oC2}) + (V_{oA3} + V_{oB3} + V_{oC3}) + (V_{oA4} + V_{oB4} + V_{oC4})$ | $1 \times V_x$ | $12 \times I_x$ |
| 2 | $((V_{oA1} + V_{oB1} + V_{oC1}) + (V_{oA2} + V_{oB2} + V_{oC2})) - ((V_{oA3} + V_{oB3} + V_{oC3}) + (V_{oA4} + V_{oB4} + V_{oC4}))$ | $2 \times V_x$ | $6 \times I_x$ |
| 3 | $(V_{oA1} + V_{oB1} + V_{oC1}) - (V_{oA2} + V_{oB2} + V_{oC2}) - (V_{oA3} + V_{oB3} + V_{oC3}) - (V_{oA4} + V_{oB4} + V_{oC4})$ | $4 \times V_x$ | $3 \times I_x$ |

Note:
"+" represents parallel connection, "−" represents series connection.

Tables 2A and 2B show equivalent connections that may be implemented to achieve the same output voltages and currents, using different sub-combinations. The embodiment of Table 2B may be considered to be simplified in that the same sub-combinations of three converter modules are used in all three modes. In this embodiment, each sub-combination includes one module from each AC phase, for example:

Sub-combination 1 (ABC1) is a parallel connection of $V_{oA1}$, $V_{oB1}$, and $V_{oC1}$;
Sub-combination 2 (ABC2) is a parallel connection of $V_{oA2}$, $V_{oB2}$, and $V_{oC2}$;
Sub-combination 3 (ABC3) is a parallel connection of $V_{oA3}$, $V_{oB3}$, and $V_{oC3}$;
Sub-combination 4 (ABC4) is a parallel connection of $V_{oA4}$, $V_{oB4}$, and $V_{oC4}$;

Referring to Table 2B, in mode 1 all four sub-combinations (ABC1, ABC2, ABC3, ABC4) are connected in parallel, and the combined output voltage ($V_{out}$) is the same as the output voltage of each converter module ($V_{out}=V_x$) and the combined output current ($I_{out}$) is about 12 times the output current of each module ($I_{out}=12*I_x$).

Mode 2 may also be achieved in two different ways as shown in Tables 2A and 2B. Referring to Table 2B, two sub-combinations are connected in parallel to form a connection #1 (for example, ABC1+ABC2) of six modules, and another two sub-combinations are connected in parallel to form a connection #2 (for example, ABC3+ABC4) of six modules. Then connection #1 (ABC1+ABC2) and connection #2 (ABC3+ABC4) are connected in series: (ABC1+ABC2)−(ABC3+ABC4), where + refers to parallel connection and − refers to series connection. Then a combined output voltage $V_{out}=2*V_x$ and a combined output current $I_{out}=6*I_x$ may be achieved.

Mode 3 may be achieved as shown in Tables 2A and 2B, wherein four sub-combinations each including three converter modules connected in parallel are formed as connection #1 modules (ABC1), connection #2 modules (ABC2), connection #3 modules (ABC3), and connection #4 modules (ABC4), and connections #1, #2, #3, and #4 are then connected in series: ABC1-ABC2-ABC3-ABC4. In this way, a combined output voltage $V_{out}=4*V_x$ and a combined output current $I_{out}=3*I_x$ is achieved.

Advantageously, the embodiments of Tables 2A and 2B operate in mode 3 provide $4 \times V_x$ without requiring large electrolytic output capacitors since the connections of the converter modules in the sub-combinations results in the double line frequency ripple being substantially cancelled. Thus, as noted above, higher output voltage levels may be realized without requiring electrolytic capacitors by adding more converter modules in each phase and avoiding series connections of converter module outputs within sub-combinations. Additionally, output voltage ranges such as those in the embodiments of Tables 1A, 1B, 2A, and 2B may be achieved by using a voltage gain of 2 in the design of each converter module.

Additional converter modules may be connected in a similar way to expand the output voltage variation range and output power rating. Embodiments may include sub-combinations each including three modules, each of the three connected to a different phase of the three phase input AC voltage and with DC outputs connected in parallel. Embodiments may include the sub-combinations being connected to each other in series, parallel, and/or in series-parallel to increase the output current or the output voltage of the combined connection by using mode selection based on the generalized embodiment of FIGS. 1A and 1B and based on the approaches shown in Table 1A, Table 1B, Table 2A, and Table 2B.

In some embodiments the output voltage of each converter module may be fixed. In other embodiments, and in certain applications, the output voltage of each converter module may be adjustable and therefore different final output voltages of the combined converters ($V_{out}$) may be obtained. For example, converter modules may be implemented with variable gain. Both lower gain and smaller gain rain range allow the design of converter modules to be optimized for better performance, while a larger gain and a wider gain range reduce converter efficiency. In some embodiments a gain variation range of 2 may be implemented. In some embodiments a gain variation range of +/−10% may be implemented.

Below are examples of various methods that may be used to achieve $V_{out}=3*V_x$:

Method 1 uses six modules (two modules in each phase) as shown in mode 2 in Table 1A and 1B, and regulates the output voltage of each module to $V_{o1}=1.5*V_x$. The final output voltage $V_{out}=2*1.5V_x=3*V_x$.

Method 2 uses 12 modules (four modules in each phase) as shown in mode 2 in Tables 2A and 2B, and regulates the output voltage of each module to $V_{o1}=1.5*V_x$. The final output voltage $V_{out}=2*V_{o1}=2*1.5*V_x=3*V_x$.

Method 3 uses 12 modules (four modules in each phase) as shown in Tables 2A and 2B, and regulates the output voltage of each module to $V_{o1}=0.75*V_x$. Then the final output voltage $V_{out}=4*V_{o1}=4*0.75*V_x=3*V_x$.

Therefore, by adjusting the output voltage of each module, the final output voltage $V_{out}$ may be adjusted continuously. In the case of six modules, or two modules for each AC phase, the final output voltage $V_{out}$ may be adjusted from $0.5V_x$ to $3V_x$ (for a ratio of 6:1) under the assumption that output voltage of each module is adjustable from $0.5V_x$ to $1.5V_x$.

In the case of 12 modules, or four modules for each AC phase, the output voltage may be adjusted from $0.5V_x$ to $6V_x$ (for a ratio of 12:1) under the assumption that the output voltage of each module is adjustable from $0.5\,v_x$ to $1.5\,V_x$.

In general, in order to utilize all the modules under all the conditions, an even number of modules in each AC phase may be used. In the examples above, if two modules are used for each phase (e.g., as shown in Tables 1A and 1B), a final output voltage of $1*V_x$ and $2*V_x$ may be generated substantially without double line frequency (e.g., 120 Hz) ripple. If four modules are used in each AC phase (e.g., as shown in Tables 2A and 2B), a final output voltage of $1*V_x$, $2*V_x$, and $4*V_x$ may be generated without double line frequency ripple. In such embodiments, a sub-combination of three converter modules in each phase may be used. The outputs of the three modules in each sub-combination are connected together in parallel. The inputs of the three modules in each sub-combination are connected to three different phases of the AC voltage, with the first module connected to phase AB, the second module connected to phase BC, and the third module connected to phase CA.

For example, if six modules are used for each AC phase, a total of 18 modules are used for the three phase system. In this way, the final output voltage $V_{out}$ may be set at $V_x$, $2V_x$, $3V_x$, and $6V_x$. If eight modules are used for each AC phase, total of a total of 24 modules are used for the three-phase system. The final output voltage $V_{out}$ may be set at $V_x$, $2V_x$, $4V_x$, and $8V_x$. Therefore, based on the required final output voltage variation range for a given application, the number of converter modules for each phase may be selected to meet the requirement, where the sub-combination substantially cancels the double line frequency ripple.

In the above description, line to line AC voltage is used as an example. For example, $V_{AB}$ indicates the line to line voltage between phase A and phase B. However, embodiments may also be used with phase voltage. For example, the input of converter module A1 may be connected to phase A voltage, $V_A$; the input of converter module B1 may be connected to phase B voltage $V_B$; and the input of converter module C1 may be connected to phase C voltage $V_c$.

Example. Simulation Results of a 60 kW Rectifier

A 60 kW simulation model with six converter modules was built in the PSIM (Powersim Inc., Troy, MI, U.S.A.) environment to verify the performance of a three-phase reconfigurable module rectifier embodiment with two modules in each phase. In the design of each converter module, a variable output voltage with a gain ratio of 2 was used for the output of each transformer ($0.5 \times V_x$ to $V_x$). In this design, the output voltage variation range of each module (i.e., $V_{oA1}$, $V_{oA2}$, $V_{oB1}$, $V_{oB2}$, $V_{oC1}$, and $V_{oC2}$) was designed to be from 200 V to 400 V, so that with Mode 1 the output voltage range was from 200V to 400V, with Mode 2 the output voltage range was from 400 V to 800 V, and with Mode 3 the output voltage range was from 600 V to 1200 V. Therefore, a full wide output voltage range of 200 V to 1200 V was covered by reconfiguring the output of the rectifier according to the three modes.

Table 3 lists the parameters used for the simulation of the designed rectifier. The turns ratio of the transformer was designed such that the lower limit of the output voltage (i.e., 200 V) was achieved around the series resonant frequency. As described in [10], for a single-stage LLC converter to achieve proper PFC, the switching frequency varies between the parallel resonant frequency and series resonant frequency. The switching frequency range in this design was set between 120 kHz and 320 kHz. The rated power of each module was 10 kW, and the maximum output current of each module was delivered for the minimum output voltage condition of each module (i.e., 50 A at 200 V). The total output capacitance was only 200 μF in Mode 1 and Mode 2, and it was 2 mF for Mode 3. As mentioned above, in Mode 3 the output of three phases is connected in series, and hence the double line frequency current ripple is not cancelled in the output capacitors, which requires additional larger output capacitors connected to the converter module outputs. As discussed, large output capacitors in Mode 3 may be avoided by using four converter modules in each phase. For the control of the proposed rectifier, multiple independent inner current loops were implemented one for each module to perform the PFC on each module and one outer voltage loop is implemented to regulate the output voltage.

TABLE 3

Parameters used in the simulation with two converter modules in each phase.

| Parameters | Value |
|---|---|
| Three-Phase Voltages ($V_{ab}$, $V_{bc}$, $V_{ca}$) | 480 $V_{rms}$ |
| Line Frequency | 60 Hz |
| Output Voltage Range ($V_o$) | 200 $V_{dc}$-1200 $V_{dc}$ |
| Maximum Output Power ($P_o$) | 10 kW × 6 |
| Maximum Output Current of Each Phase | 50 A |
| Switching Frequency Range | 120 kHz-320 kHz |
| Magnetizing Resonant Inductor ($L_m$) | 50 μH |
| Series Resonant Inductor ($L_r$) | 10 μH |
| Series Resonant Capacitor ($C_r$) | 25 nF |
| Transformer Turns Ratio ($N_p$:$N_s$) | 3.4:1 |
| Total Output Capacitance | 33 μF × 6 |

FIGS. 4-7 show the simulation results, where, from top to bottom, the plots show the three phase rectifier output voltage $V_o$, the output current $I_o$, the output voltage of each converter module $V_{oA1}$, $V_{oA2}$, $V_{oB1}$, $V_{oB2}$, $V_{oC1}$, and $V_{oC2}$, the input three phase line to line voltage $V_{ab}$, $V_{bc}$, $V_{ca}$, the input current for each phase $I_{inA1}$, $I_{inA2}$, $I_{inB1}$, $I_{inB2}$, $I_{inC1}$, and $I_{inC2}$, and the resonant current for each phase $I_{rA1}$, $I_{rA2}$, $I_{rB1}$, $I_{rB2}$, $I_{rC1}$, and $I_{rC2}$.

Figure 4:
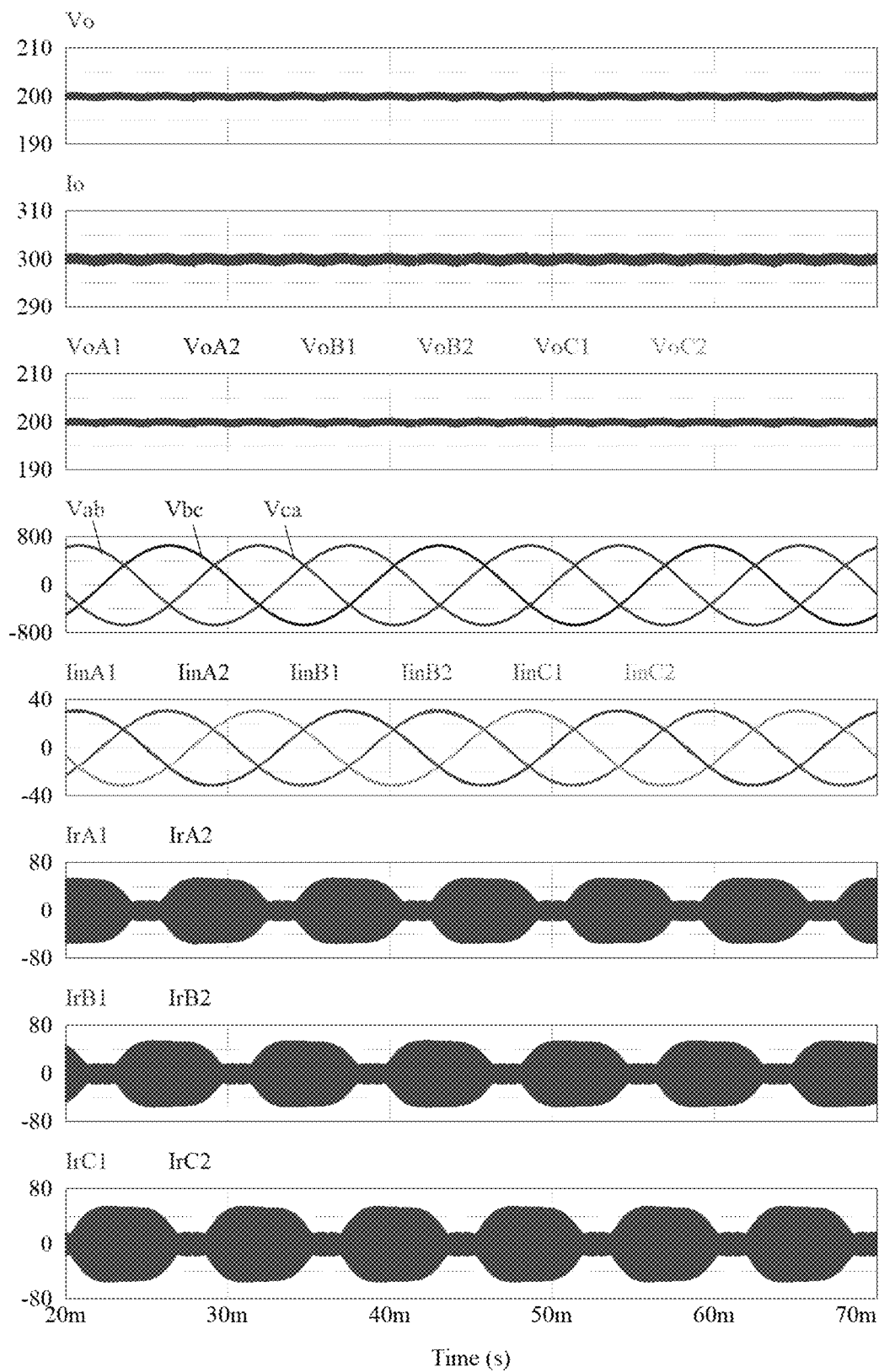

FIG. 4 shows the simulation results for the 200 V output voltage condition while the rectifier is operating in Mode 1. As indicated in Table 1A and shown in FIG. 3A, the outputs of all six modules are connected in parallel, and hence all converter module output voltages (i.e., $V_{oA1}$, $V_{oA2}$, $V_{oB1}$, $V_{oB2}$, $V_{oC1}$, and $V_{oC2}$) are equal to 200 V and there is substantially no low frequency current flowing into the output capacitors as indicated by a very low peak-to-peak output voltage ripple. It is observed that the waveforms of $I_{inA1}$, $I_{inA2}$, $I_{inB1}$, $I_{inB2}$, $I_{inC1}$, and $I_{inC2}$ are sinusoidal and therefore, that PFC was achieved, and the input currents are sinusoidal with minimal harmonics. In this case, the frequency of the resonant tank was modulated at the parallel resonant frequency and the series resonant frequency to achieve PFC.

Figure 5:
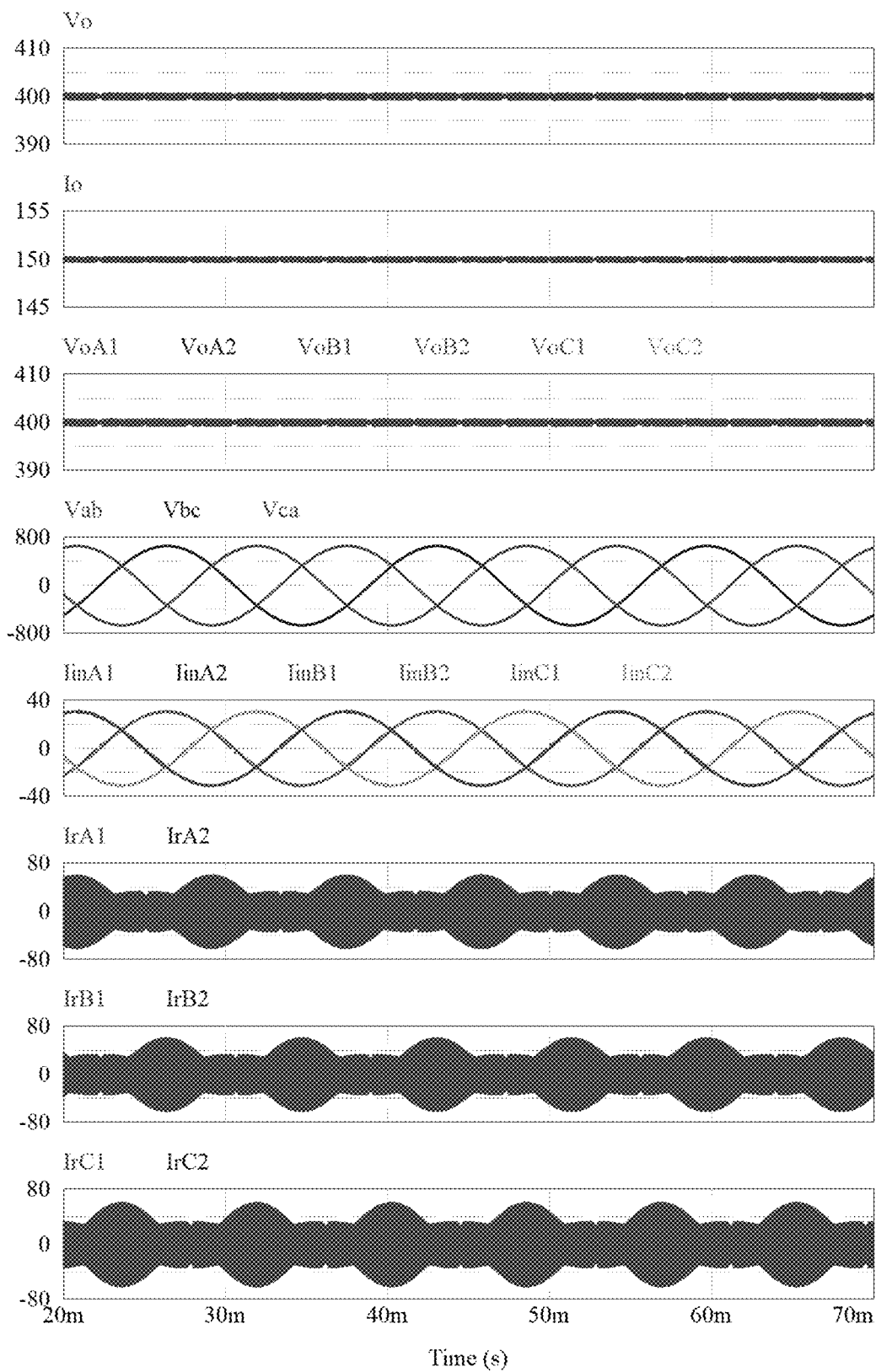

FIG. 5 shows the simulation results for the 400 V output voltage condition while the rectifier is still operating in Mode 1. Similar to the 200 V condition all converter module output voltages were set to 400 V and there was substantially no low-frequency ripple in the output capacitors, as indicated by a very low peak-to-peak output voltage ripple of only around 1 V. The power factor was also close to unity as indicated by the sinusoidal three-phase currents.

Figure 6:
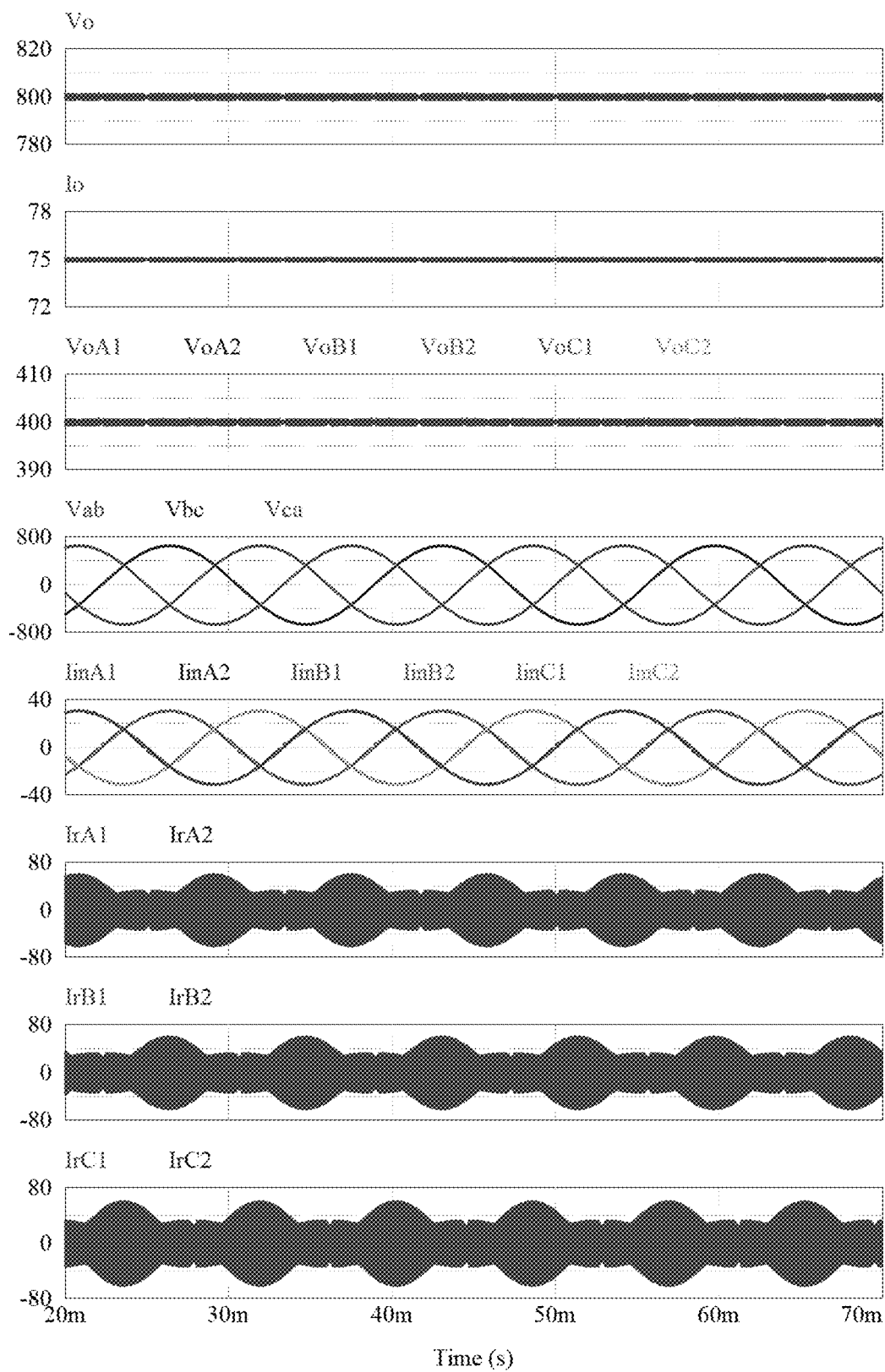

FIG. 6 shows the simulation results for the 800 V output voltage condition while operating in Mode 2. Referring to Table 1A and as shown in FIG. 3C, the first modules of each phase were connected in parallel, and the second modules of each phase were connected in parallel, resulting in two substantially pure 400 V DC voltages that were connected in series to generate 800 V. As can be observed from FIG. 6 the converter module output voltages were substantially ripple-free DC at 400 V, as described above.

Figure 7:
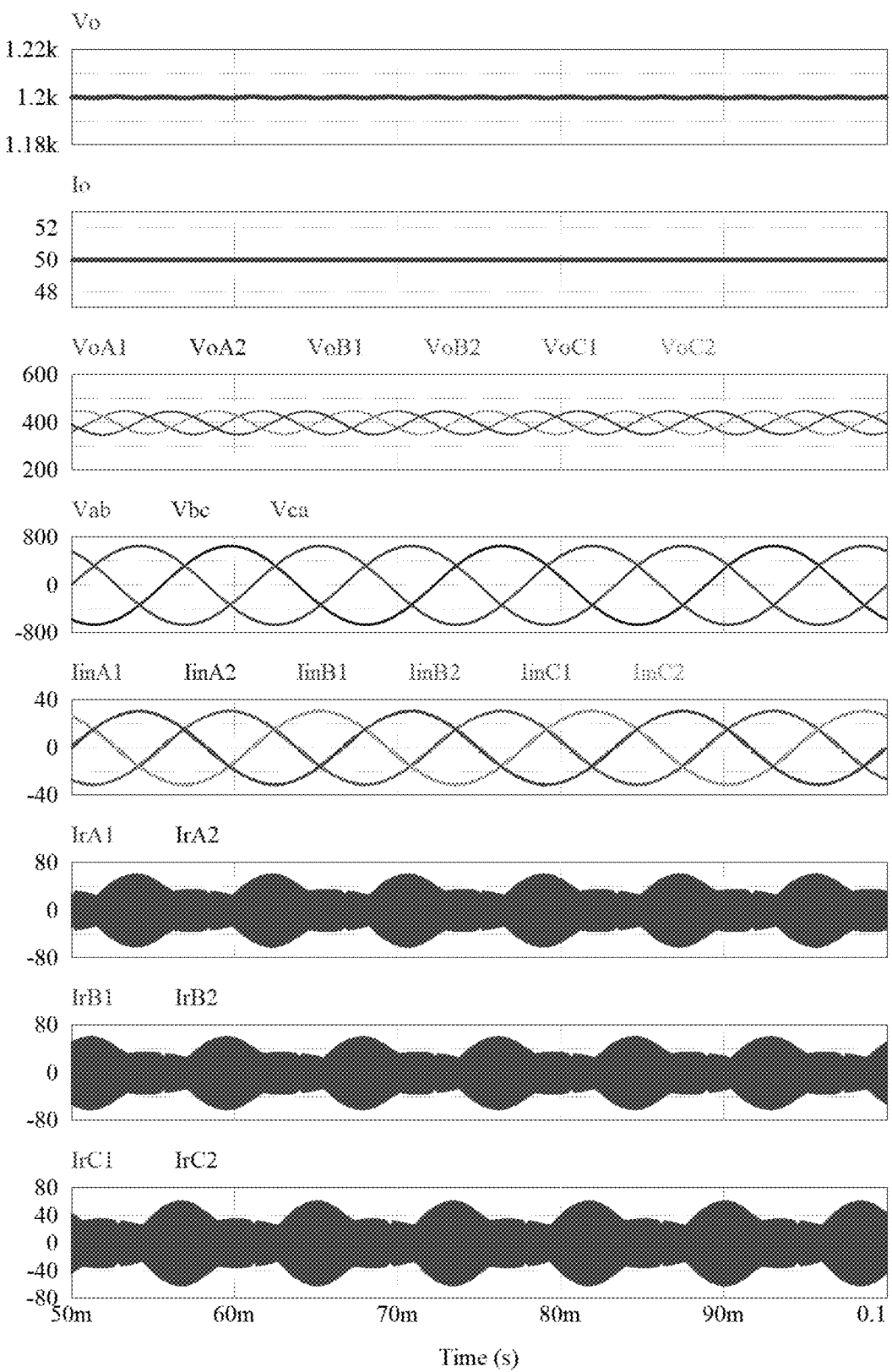

FIG. 7 shows the simulation results for the 1200 V output voltage condition while operating in Mode 3. Referring to Table 1A and as shown in FIG. 3D, both converter modules in each phase were connected in parallel and the three-phases were connected in series. As can be observed from the converter module output voltages in FIG. 7 there was a double line frequency current ripple in the output capacitor of each phase. However, the total output voltage $V_o$ had substantially no low frequency current, and the peak-to-peak voltage ripple was around 1 V, although this may have been influenced by the simulation.

It is noted that the 1200 V output voltage level may be achieved with four converter modules in each phase with Mode 3 output configuration as shown in Tables 2A and 2B. In this condition, the first, second, third, and fourth converter modules of each phase are connected in parallel to the respective converter modules in other phases and then the resulting four DC voltages are connected in series. Hence, with a $0.5 \times V_x$, to $V_x$, voltage ratio, the output voltage can vary from 1200 V to 2400 V.

All cited documents are incorporated herein by reference in their entirety.

EQUIVALENTS

Those of ordinary skill in the art will recognize, or be able to ascertain through routine experimentation, equivalents to the embodiments described herein. Such equivalents are within the scope of the invention and are covered by the appended claims.

REFERENCES

[1] M. Abbasi and J. Lam, "A Very High-Gain-Modular Three-Phase AC/DC Soft-Switched Converter Featuring High-Gain ZCS Output Rectifier Modules Without Using Step-Up Transformers for a DC Grid in Wind Systems," *IEEE Trans. Ind. Appl.*, vol. 54, no. 4, pp. 3723-3736, July-Aug. 2018.

[2] K. Odriozola, T. A. Meynard and A. Lacarnoy, "Multi-Level Multiplexed Power Converter Topology for 1500V Applications," in *Proc. 45th Annual Conference of the IEEE Industrial Electronics Society (IECON)*, 2019, pp. 4405-4410.

[3] P. Bastidas Erazo, U. Schichler and P. Zeller, "Design Challenges of a ±50 kV Battery Energy Storage System (BESS) for MVDC Grids," in *Proc. VDE High Voltage Technology 2020; ETG-Symposium*, 2020, pp. 1-7.

[4] S. Chaurasiya and B. Singh, "A 20 kW Three Phase Off-Board Charging System with Multiple Outputs for Wide Variety of EVs," in *Proc. IEEE International Power and Renewable Energy Conference (IPRECON)*, 2021, pp. 1-6.

[5] M. Abbasi and J. Lam, "A Modular SiC-Based Step-Up Converter With Soft-Switching-Assisted Networks and Internally Coupled High-Voltage-Gain Modules for Wind Energy System With a Medium-Voltage DC-Grid," *IEEE J. Emerg. Sel. Top. Power Electron.*, vol. 7, no. 2, pp. 798-810, June 2019.

[6] P. Sun, L. Zhou and K. M. Smedley, "A Reconfigurable Structure DC—DC Converter With Wide Output Range and Constant Peak Power," *IEEE Trans. Power Electron.*, vol. 26, no. pp. 2925-2935, Oct. 2011.

[7] M. S. A. Dahidah, H. Liu and V. G. Agelidis, "Reconfigurable Converter with Multiple-Voltage Multiple-Power for E-Mobility Charging," in *Proc. International Power Electronics Conference (IPEC-Niigata 2018-ECCE Asia)*, 2018, pp. 3215-3222.

[8] C. Shen, H. Wu, T. Liu and M. Li, "A Three-Phase Asymmetrical Dual-Active-Bridge Converter With Series/Parallel-Reconfigurable Output for Wide Voltage Range Applications," *IEEE Trans. Ind. Electron.*, vol. 68, no. 9, pp. 7714-7724, September 2021.

[9] M. A. Bakar, M. F. Alam, M. Wardemark and K. Bertilsson, "A 2×3 Reconfigurable Modes Wide Input Wide Output Range DC-DC Power Converter," *IEEE Access*, vol. 9, pp. 44292-44303, 2021.

The invention claimed is:

1. A three phase rectifier, comprising:
three phases A, B, and C;
n phase A converter modules in phase A, n phase B converter modules in phase B, and n phase C converter modules in phase C of the three phase rectifier;
each of the n phase A converter modules having an AC input that receives an AC voltage and a DC output that outputs a DC voltage;
each of the n phase B converter modules having an AC input that receives an AC voltage and a DC output that outputs a DC voltage;
each of the n phase C converter modules having an AC input that receives an AC voltage and a DC output that outputs a DC voltage;
wherein the AC inputs of the n phase A converter modules are connected together in parallel, the AC inputs of the n phase B converter modules are connected together in parallel, and the AC inputs of the n phase C converter modules are connected together in parallel;
wherein the DC output of a first converter module of the n phase A converter modules, the DC output of a first converter module of the n phase B converter modules, and the DC output of a first converter module of the n phase C converter modules are connected together in parallel as a first sub-combination DC output;
wherein the DC output of a $n^{th}$ converter module of the n phase A converter modules, the DC output of a $n^{th}$ converter module of the n phase B converter modules, and the DC output of a $n^{th}$ converter module of the n phase C converter modules are connected together in parallel as a $n^{th}$ sub-combination DC output;
a mode switcher having inputs connected to respective first to $n^{th}$ sub-combination DC outputs and having an output that outputs a total output DC voltage;
wherein the mode switcher connects the first to $n^{th}$ sub-combination DC outputs together in selected modes to produce a range of total output DC voltage;
wherein the range of total output DC voltage is substantially free of double line frequency ripple;
wherein the n phase A converter modules, n phase B converter modules, and n phase C converter modules are implemented without electrolytic output capacitors.

2. The three phase rectifier of claim 1, wherein the selected modes are selected from series, parallel, and series-parallel connections of the first to $n^{th}$ sub-combination DC outputs.

3. The three phase rectifier of claim 1, wherein n=2;
wherein each phase A converter module has an output DC voltage of $V_x$, each phase B converter module has an output DC voltage of $V_x$, and each phase C converter module has an output DC voltage of $V_x$;
wherein the range of total output DC voltage is from $V_x$ to $2V_x$.

4. The three phase rectifier of claim 1, wherein n=4;
wherein each phase A converter module has an output DC voltage of $V_x$, each phase B converter module has an output DC voltage of $V_x$, and each phase C converter module has an output DC voltage of $V_x$;
wherein the range of total output DC voltage is from $V_x$ to $4V_x$.

5. The three phase rectifier of claim 1, wherein the n phase A converter modules and the n phase B converter modules and the n phase C converter modules are substantially the same.

6. The three phase rectifier of claim 1, wherein the n phase A converter modules and the n phase B converter modules and the n phase C converter modules are selected from LLC resonant converter, boost converter, dual active bridge (DAB) converter, LCLC converter, active clamp boost converter, flyback converter, SEPIC converter, Zeta converter, and Cuk converter.

7. The three phase rectifier of claim 1, wherein the n phase A converter modules and the n phase B converter modules and the n phase C converter modules are LLC resonant converters.

8. The three phase rectifier of claim 1, wherein the mode switcher automatically selects a mode to deliver a selected total output DC voltage to a load.

9. The three phase rectifier of claim 1, wherein a three phase AC input source is configured as line-to-line voltage.

10. The three phase rectifier of claim 1, wherein a three phase AC input source is configured as phase voltage.

11. An electric vehicle charger comprising the three phase rectifier of claim 1.

12. A method for implementing a three phase rectifier, comprising:
providing three phases A, B, and C;
providing n phase A converter modules in phase A, n phase B converter modules in phase B, and n phase C converter modules in phase C of the three phase rectifier;
each of the n phase A converter modules having an AC input that receives an AC voltage and a DC output that outputs a DC voltage;
each of the n phase B converter modules having an AC input that receives an AC voltage and a DC output that outputs a DC voltage;
each of the n phase C converter modules having an AC input that receives an AC voltage and a DC output that outputs a DC voltage;
wherein the AC inputs of the n phase A converter modules are connected together in parallel, the AC inputs of the n phase B converter modules are connected together in parallel, and the AC inputs of the n phase C converter modules are connected together in parallel;
wherein the DC output of a first converter module of the n phase A converter modules, the DC output of a first converter module of the n phase B converter modules, and the DC output of a first converter module of the n phase C converter modules are connected together in parallel as a first sub-combination DC output;
wherein the DC output of a $n^{th}$ converter module of the n phase A converter modules, the DC output of a $n^{th}$ converter module of the n phase B converter modules, and the DC output of a $n^{th}$ converter module of the n phase C converter modules are connected together in parallel as a $n^{th}$ sub-combination DC output;
connecting the first to $n^{th}$ sub-combination DC outputs together in selected modes to produce a range of total output DC voltage;
wherein the range of total output DC voltage is substantially free of double line frequency ripple;
wherein the n phase A converter modules, n phase B converter modules, and n phase C converter modules are implemented without electrolytic output capacitors.

13. The method of claim 12, comprising using a mode switcher to connect the first to $n^{th}$ sub-combination DC outputs together in selected modes to produce the range of total output DC voltage.

14. The method of claim 12, wherein the selected modes are selected from series, parallel, and series-parallel connections of the first to $n^{th}$ sub-combination DC outputs.

15. The method of claim 12, wherein n=2;
wherein each phase A converter module has an output DC voltage of $V_x$, each phase B converter module has an output DC voltage of $V_x$, and each phase C converter module has an output DC voltage of $V_x$;
wherein the range of total output DC voltage is from $V_x$ to $2V_x$.

16. The method of claim 12, wherein n=4;
wherein each phase A converter module has an output DC voltage of $V_x$, each phase B converter module has an output DC voltage of $V_x$, and each phase C converter module has an output DC voltage of $V_x$;
wherein the range of total output DC voltage is from $V_x$ to $4V_x$.

17. The method of claim 12, wherein the n phase A converter modules and the n phase B converter modules and the n phase C converter modules are selected from LLC resonant converter, boost converter, dual active bridge (DAB) converter, LCLC converter, active clamp boost converter, flyback converter, SEPIC converter, Zeta converter, and Cuk converter.

18. The method of claim 12, wherein the n phase A converter modules and the n phase B converter modules and the n phase C converter modules are LLC resonant converters.

19. The method of claim 12, comprising automatically selecting a mode to deliver a selected total output DC voltage to a load.

20. The method of claim 12, comprising configuring the three phase rectifier as an electric vehicle charger.

* * * * *